United States Patent
Champy

(10) Patent No.: US 11,567,726 B2
(45) Date of Patent: Jan. 31, 2023

(54) METHODS, SYSTEMS, AND MEDIA FOR PROVIDING INFORMATION RELATING TO DETECTED EVENTS

(71) Applicant: Google LLC, Mountain View, CA (US)

(72) Inventor: Adam Champy, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/656,653

(22) Filed: Jul. 21, 2017

(65) Prior Publication Data

US 2019/0026066 A1  Jan. 24, 2019

(51) Int. Cl.
*G06F 3/16* (2006.01)
*G08B 21/18* (2006.01)
(Continued)

(52) U.S. Cl.
CPC .............. *G06F 3/165* (2013.01); *G06F 3/162* (2013.01); *G06F 16/24565* (2019.01);
(Continued)

(58) Field of Classification Search
CPC ...... G06F 3/165; G06F 3/162; G06F 3/04842; G06F 16/24565; G06F 16/686;
(Continued)

(56) References Cited

U.S. PATENT DOCUMENTS 8,611,954 B2  12/2013  Gross
8,612,311 B2  12/2013  Gross
(Continued)

FOREIGN PATENT DOCUMENTS

JP   2008177850   7/2008
KR   20030001504  1/2003
WO   WO 2016130230  8/2016

OTHER PUBLICATIONS

Angela Moscaritolo, "These Smart Cams Will Work With Amazon's Echo Show," Jun. 22, 2017, PC, https://www.pcmag.com/news/these-smart-cams-will-work-with-amazons-echo-show, 7 pages (Year: 2017).*

(Continued)

*Primary Examiner* — Tadesse Hailu
(74) *Attorney, Agent, or Firm* — Kilpatrick Townsend & Stockton LLP

(57) ABSTRACT

Methods, systems, and media for providing information are provided. In some implementations, a method for providing information is provided, the method comprising: associating a first recording device of a group of recording devices located in an environment of a user with a trigger term; receiving, from a user device, a query that includes the trigger term; in response to receiving the query, determining that audio data is to be transmitted from at least one recording device from the group of recording devices in the environment of the user; identifying the first recording device based on the inclusion of the trigger term in the received query; receiving the audio data from the first recording device; identifying a characteristic of an animate object in the environment of the user based on the received audio data; and presenting information indicating the characteristic of the animate object on the user device.

18 Claims, 5 Drawing Sheets

(51) Int. Cl.
| | |
|---|---|
| *G10L 17/26* | (2013.01) |
| *G08B 13/16* | (2006.01) |
| *H04N 21/4363* | (2011.01) |
| *G08B 21/02* | (2006.01) |
| *G10L 25/51* | (2013.01) |
| *G06F 16/2455* | (2019.01) |
| *G06F 16/68* | (2019.01) |
| *G10L 15/08* | (2006.01) |
| *G10L 15/22* | (2006.01) |
| *H04R 29/00* | (2006.01) |
| *H04N 7/18* | (2006.01) |
| *G06F 3/04842* | (2022.01) |

(52) U.S. Cl.
CPC ....... *G06F 16/686* (2019.01); *G08B 13/1672* (2013.01); *G08B 21/0208* (2013.01); *G08B 21/18* (2013.01); *G10L 15/08* (2013.01); *G10L 15/22* (2013.01); *G10L 17/26* (2013.01); *G10L 25/51* (2013.01); *H04N 21/43635* (2013.01); *H04R 29/00* (2013.01); *G06F 3/04842* (2013.01); *G10L 2015/088* (2013.01); *H04N 7/181* (2013.01)

(58) Field of Classification Search
CPC ............... G08B 21/18; G08B 21/0208; G08B 13/1672; G10L 15/08; G10L 15/22; G10L 2015/088; G10L 17/26; G10L 25/51; H04R 29/00; H04N 21/43635; H04N 7/181
See application file for complete search history.

(56) References Cited

U.S. PATENT DOCUMENTS

| | | | | |
|---|---|---|---|---|
| 9,734,845 | B1* | 8/2017 | Liu | G10L 15/22 |
| 9,819,905 | B1* | 11/2017 | Breitbard | H04N 7/147 |
| 10,075,828 | B2* | 9/2018 | Horton | H04L 12/2829 |
| 10,181,323 | B2* | 1/2019 | Beckhardt | G06F 3/165 |
| 2002/0101350 | A1 | 8/2002 | Thompson | |
| 2007/0030155 | A1* | 2/2007 | Van Woudenberg | A61B 7/003 340/573.1 |
| 2008/0129821 | A1 | 6/2008 | Howarter | |
| 2009/0077601 | A1* | 3/2009 | Brailean | H04L 29/06027 725/109 |
| 2013/0107029 | A1 | 5/2013 | Knasel | |
| 2014/0266669 | A1 | 9/2014 | Fadell et al. | |
| 2015/0097687 | A1* | 4/2015 | Sloo | G08B 25/012 340/632 |
| 2015/0222757 | A1 | 8/2015 | Cheatham, III et al. | |
| 2015/0228281 | A1* | 8/2015 | Raniere | G10L 15/22 704/275 |
| 2015/0340040 | A1* | 11/2015 | Mun | G10L 17/22 704/246 |
| 2016/0027278 | A1* | 1/2016 | McIntosh | G08B 21/0423 715/741 |
| 2016/0094812 | A1 | 3/2016 | Chen | |
| 2016/0099976 | A1 | 4/2016 | Vargheese et al. | |
| 2016/0148016 | A1 | 5/2016 | Rylski | |
| 2016/0150338 | A1* | 5/2016 | Kim | G08B 1/08 381/58 |
| 2016/0260135 | A1* | 9/2016 | Zomet | H04L 12/2834 |
| 2016/0286327 | A1* | 9/2016 | Marten | H04R 29/008 |
| 2016/0321506 | A1* | 11/2016 | Fridental | G06K 9/00335 |
| 2017/0358317 | A1* | 12/2017 | James | G10L 15/30 |
| 2018/0204569 | A1* | 7/2018 | Nadkar | G10L 15/22 |

OTHER PUBLICATIONS

Eric Griffith, "Got a Newborn? How Amazon Alexa Can Make Life Easier," May 14, 2018, https://www.pcmag.com/how-to/got-a-newborn-how-amazon-alexa-can-make-life-easier, 15 pages (Year: 2018).*

Dube, Ryan, "3 Most Effective Cell Phone Surveillance Apps to Monitor Your Kids", Oct. 15, 2010, available at: http://www.makeuseof.com/tag/3-effective-cell-phone-surveillance-apps/, pp. 1-12.

International Search Report and Written Opinion dated Sep. 27, 2018 in International Patent Application No. PCT/US2018/037519.

Office Action dated Apr. 24, 2021 in KR Patent Application No. 10-2019-7036040.

Notice of Allowance dated Jul. 7, 2020 in JP Patent Application No. 2019-567235.

Examination Report dated Oct. 8, 2021 in IN Patent Application No. 201947048573.

First Office Action for Chinese Patent Appln No. 201880037153.X dated Nov. 2, 2022, all pages.

* cited by examiner

METHODS, SYSTEMS, AND MEDIA FOR PROVIDING INFORMATION RELATING TO DETECTED EVENTS

TECHNICAL FIELD

The disclosed subject matter relates to methods, systems, and media for providing information related to detected events.

BACKGROUND

Many people own multiple user devices that may all be capable of recording audio and/or video data within their home. For example, a person may have multiple mobile devices, a virtual assistant device, one or more smart televisions, and/or other such devices within their home, and these devices may be located in different rooms. In many cases, a device may be capable of recording audio data or video data that indicates an event that may be of interest to the person, such as a child crying. However, it can be difficult to use devices to detect events of interest and provide information of the events to people.

Accordingly, it is desirable to provide new methods, systems, and media for providing information related to detected events.

SUMMARY

In accordance with various implementations of the disclosed subject matter, methods, systems, and media for providing information are provided.

In accordance with some implementations of the disclosed subject matter, a method for providing information is provided, the method comprising: associating a first recording device of a group of recording devices located in an environment of a user with a trigger term; receiving, from a user device, a query that includes the trigger term; in response to receiving the query, determining that audio data is to be transmitted from at least one recording device from the group of recording devices in the environment of the user; identifying the first recording device based on the inclusion of the trigger term in the received query; receiving the audio data from the first recording device; identifying a characteristic of an animate object in the environment of the user based on the received audio data; and presenting information indicating the characteristic of the animate object on the user device.

In accordance with some implementations of the disclosed subject matter, a system for providing information is provided, the system comprising: a hardware processor that is programmed to: associate a first recording device of a group of recording devices located in an environment of a user with a trigger term; receive, from a user device, a query that includes the trigger term; in response to receiving the query, determine that audio data is to be transmitted from at least one recording device from the group of recording devices in the environment of the user; identify the first recording device based on the inclusion of the trigger term in the received query; receive the audio data from the first recording device; identify a characteristic of an animate object in the environment of the user based on the received audio data; and present information indicating the characteristic of the animate object on the user device.

In accordance with some implementations of the disclosed subject matter, a non-transitory computer-readable medium containing computer executable instructions that, when executed by a processor, cause the processor to perform a method for providing information is provided, the method comprising: associating a first recording device of a group of recording devices located in an environment of a user with a trigger term; receiving, from a user device, a query that includes the trigger term; in response to receiving the query, determining that audio data is to be transmitted from at least one recording device from the group of recording devices in the environment of the user; identifying the first recording device based on the inclusion of the trigger term in the received query; receiving the audio data from the first recording device; identifying a characteristic of an animate object in the environment of the user based on the received audio data; and presenting information indicating the characteristic of the animate object on the user device.

In accordance with some implementations of the disclosed subject matter, a system for providing information is provided, the system comprising: means for associating a first recording device of a group of recording devices located in an environment of a user with a trigger term; means for receiving, from a user device, a query that includes the trigger term; in response to receiving the query, means for determining that audio data is to be transmitted from at least one recording device from the group of recording devices in the environment of the user; means for identifying the first recording device based on the inclusion of the trigger term in the received query; means for receiving the audio data from the first recording device; means for identifying a characteristic of an animate object in the environment of the user based on the received audio data; and means for presenting information indicating the characteristic of the animate object on the user device.

In some implementations, associating the first recording device with the trigger term is based on audio data previously recorded by the first recording device.

In some implementations, associating the first recording device with the trigger term is based on a known location of the first recording device within the environment of the user.

In some implementations, associating the first recording device with the trigger term is based on an inferred location of the first recording device, wherein the inferred location is determined based on a previously received query from the user device.

In some implementations, the information is presented within a user interface that includes a selectable input that causes the received audio data to be presented by the user device.

In some implementations, the information is presented within a user interface that includes a selectable input that causes the first recording device to record additional audio data.

In some implementations, the system further comprises: means for receiving second audio data from a second recording device of the group of recording devices; means for detecting an event related to the animate object based on the received second audio data; means for determining whether the detected event is likely to be of interest to the user of the user device; and in response to determining that the detected event is likely to be of interest to the user, means for causing an indication of the detected event to be presented on the user device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
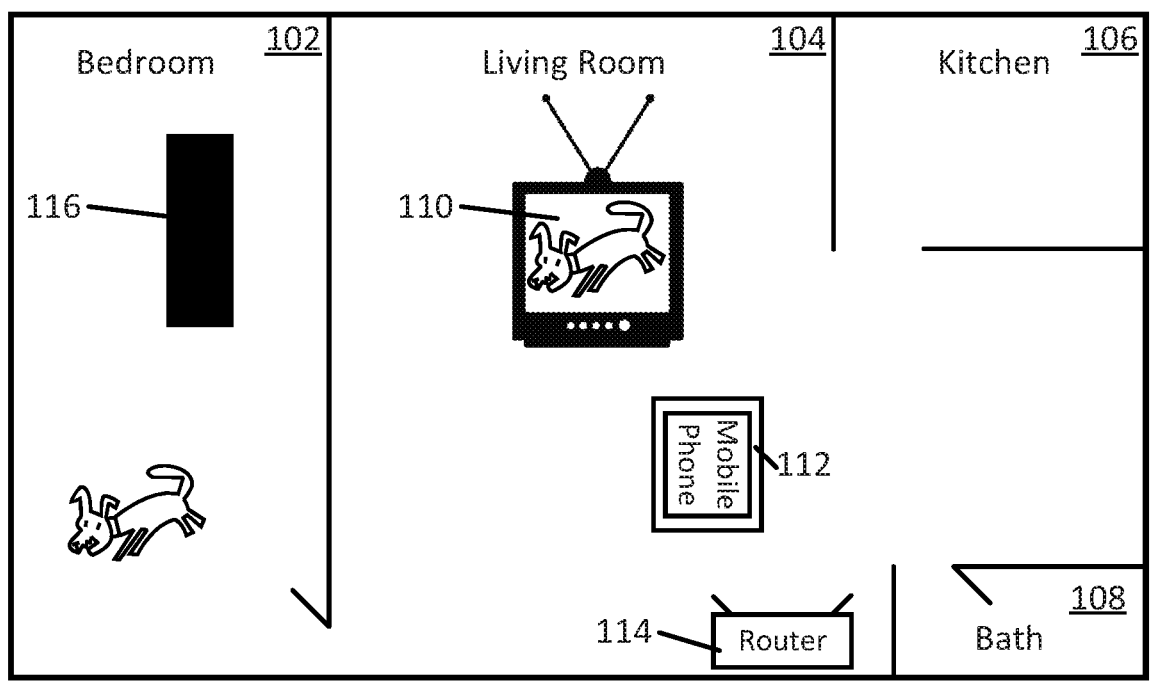
FIG. 1 shows an example of an illustrative layout of user devices in a user's home in accordance with some implementations of the disclosed subject matter.

In accordance with various implementations, mechanisms (which can include methods, systems, and media) for providing information related to detected events are provided.

In some implementations, the mechanisms described herein can collect audio data and/or video data from one or more devices located throughout a user's home or other environment, and can use the collected data to provide information to a user about, for example, an object or person in the user's home. For example, in some implementations, the mechanisms can provide information about a current state or activity of the user's child, pet, elderly relative, and/or any other suitable person or object. As a more particular example, in some implementations, the mechanisms can provide an alert or message to a user indicating that the user's baby is awake and crying, that the user's dog is scratching at furniture in a particular room in the user's home, and/or any other suitable information. In some implementations, the mechanisms can provide information in response to receiving a query from the user. For example, in some implementations, in response to receiving a query such as "what is my dog doing," the mechanisms can activate one or more devices to detect the user's dog (e.g., based on audio data that indicates a presence of the dog, based on image or video data that indicates a presence of the dog, and/or any other suitable information) and can then provide the user with a response based on the data from the devices. Additionally or alternatively, in some implementations, the mechanisms can use the one or more devices to detect an event likely to be of interest to the user (e.g., "your baby is crying," "your cat's food dish is empty," and/or any other suitable event), and can provide an alert or message to the user indicating the detected event.

Additionally or alternatively, in some implementations, the mechanisms can determine which of the one or more devices located throughout the user's home or environment can provide information responsive to a query received from the user based on the capabilities of each of the devices. For example, in some implementations, in response to receiving a query such as "turn on a live microphone for the baby room," the mechanisms can determine which of the devices in the user's home at or near a location is associated with the "baby room" and can determine which of the devices associated with the "baby" room location has a microphone capability that can be turned on. In response, the mechanisms can activate the microphone of the determined device and playback the audio signal captured by the activated microphone on a speaker or other audio output associated with the user that provided the query (e.g., a speaker on a mobile device, a speaker on a display device at a location at or near the location of the mobile device, a media receiver connected to a mobile device over a local area network, etc.).

In some implementations, the one or more devices used to collect audio data and/or video data can be any suitable types of devices, such as virtual assistant devices, voice-controlled speakers, a web camera, mobile devices (e.g., a mobile phone, a tablet computer, and/or any other suitable type of mobile device), a smart thermostat, a smart television, and/or any other suitable type(s) of devices. Note that, in some implementations, the one or more devices can be communicatively coupled in any suitable manner. For example, in some implementations, the one or more devices can each be connected to a communication network (e.g., a WiFi network, a Local Area Network, a BLUETOOTH network, and/or any other suitable network) within the environment.

In some implementations, the mechanisms described herein can select the one or more devices with which to collect the data using any suitable information. For example, in some implementations, the mechanisms can associate particular devices with particular query terms. As a more particular example, in some implementations, the mechanisms can associate the word "baby" with a device (e.g., a baby monitor) located in a particular room of a user's home. In some such implementations, the mechanisms can associate the particular device with a particular location based on any suitable information, such as an explicit indication provided by the user (e.g., via a settings interface, and/or provided in any other manner) and/or via an implicit inference (e.g., based on a determination that sounds typically associated with a baby have frequently been detected from audio data collected by the particular device, and/or in any other suitable manner).

In some implementations, the devices that collect audio data and/or video data can be activated in response to detecting a particular word or phrase, for example, a word or phrase included in a user's query. As a more particular example, in some implementations, a device can begin recording data in response to determining that the word "baby," "dog," and/or any other suitable word has been spoken. Additionally or alternatively, in some implementations, a device can record audio data and/or video data continuously and can analyze the recorded data to determine if an event likely to be of interest to a user is indicated in the recorded data. In some implementations, devices can store recorded data in any suitable manner. For example, in some implementations, data can be stored in a circular buffer of any suitable size, and collected data can be deleted if it is determined that the data does not include audio or video signals likely to be of interest to the user.

In some implementations, the mechanisms can present information in response to a query or information indicating a detected event within a user interface that can allow the user to request additional information. For example, in some implementations, the mechanisms can indicate that a particular event has been detected (e.g., "your baby is crying," "your dog is scratching your couch," and/or any other suitable event), and the user interface can allow the user to request recorded audio and/or video to be presented on a particular user device (e.g., on the user device presenting the user interface, on a different user device within the user's home, and/or any other suitable user device). As another example, in some implementations, the user interface can allow the user to activate a particular microphone or camera (e.g., a microphone or camera associated with the device that recorded the data associated with detection of the event, and/or any other suitable device) to record additional audio or video data and present the additional audio or video data on a particular user device (e.g., on the user device presenting the user interface, on a different user device within the user's home, and/or on any other suitable user device).

FIG. 1 shows an illustrative example of a layout of user devices in a user's home. In some implementations, the user's home can include multiple rooms, for example, a bedroom 102, a living room 104, a kitchen 106, and a bathroom 108. Although not shown in FIG. 1, in some implementations, user devices can additionally or alternatively be located in external locations, such as a user's car, a user's office, and/or any other suitable location. The user's home can contain any suitable number of user devices, such as a television 110, a mobile device 112, and/or a virtual assistant device 116. In some implementations, the user's home can include any other suitable devices, such as a smart thermostat, a desktop computer, a laptop computer, a tablet computer, a wearable computer, voice-controlled speakers, a projector, a web camera, and/or any other suitable devices.

In some implementations, television 110, mobile device 112, virtual assistant device 116, and any other devices in the user's home can be connected and/or communicatively coupled in any suitable manner. For example, in some devices, the devices can each be connected to a communication network through a router 114, which can be placed at any suitable location within the user's home. Note that although one television, one mobile phone, and one virtual assistant device are shown in FIG. 1, in some implementations, any suitable number of devices of each type can be included.

As shown in FIG. 1, in some implementations, a first device in the user's home can record data that includes a detection of an event, such as a baby crying or a dog barking. As described below in connection with FIGS. 4 and 5, information relating to the recorded data and/or the detected event can then be presented on a second device in the user's home. For example, as shown in FIG. 1, video or audio data corresponding to a recording of a user's dog from virtual assistant device 116 in bedroom 102 can be presented on television 110 in living room 104. In some such implementations, the video or audio data can be presented on television 110 in response to receiving a request from a third device, such as mobile device 112, as described below in more detail in connection with FIGS. 4 and 5.

Figure 2:
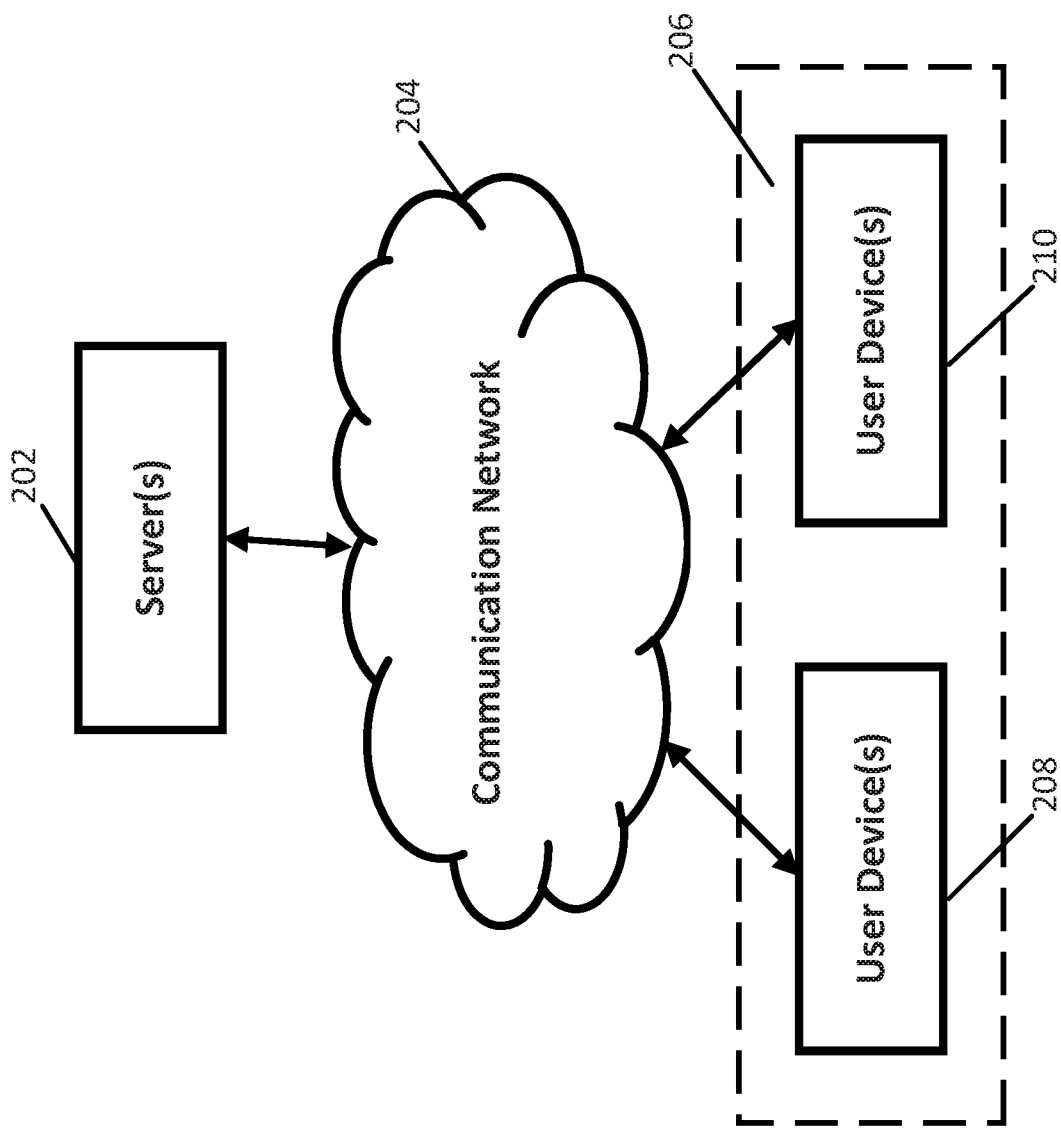
FIG. 2 shows a schematic diagram of an illustrative system suitable for implementation of mechanisms described herein for providing information related to detected events in accordance with some implementations of the disclosed subject matter.

Turning to FIG. 2, an example 200 of hardware for providing information related to detected events that can be used in accordance with some implementations of the disclosed subject matter is shown. As illustrated, hardware 200 can include one or more servers 202, a communication network 204, and/or one or more user devices 206, such as user devices 208 and 210.

Server(s) 202 can be any suitable server(s) for providing access to the mechanisms described herein for presenting information, such as a processor, a computer, a data processing device, or any suitable combination of such devices. For example, in some implementations, server(s) 202 can store information that indicates types of user devices and/or locations of user devices within a user's home. As another example, in some implementations, server(s) 202 can authenticate one or more user devices within the user's home to a particular user account. As yet another example, in some implementations, server(s) 202 can receive audio and/or video data from a user device (e.g., audio data recorded from a microphone associated with the device, video data recorded from a microphone associated with the device, and/or any other suitable audio and/or video data) and can process the audio and/or video data to determine characteristics of the data (e.g., whether the audio data includes noises associated with a baby, whether the audio data and/or video data includes noises or images of a dog or other pet, and/or any other suitable characteristics).

Communication network 204 can be any suitable combination of one or more wired and/or wireless networks in some implementations. For example, communication network 210 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links to communication network 204 that can be linked via one or more communications links to server(s) 202. The communications links can be any communications links suitable for communicating data among user devices 206 and server(s) 202 such as network links, dial-up links, wireless links, hard-wired links, any other suitable communications links, or any suitable combination of such links.

User devices 206 can include any one or more user devices suitable for receiving audio and/or video data, processing the audio and/or video data, presenting information to a user of the user device based on the audio and/or video data, and/or any other suitable functions. For example, in some implementations, user devices 206 can include a mobile device, such as a mobile phone, a tablet computer, a wearable computer, a laptop computer, a vehicle (e.g., a car, a boat, an airplane, or any other suitable vehicle) entertainment system, and/or any other suitable mobile device. As another example, in some implementations, user devices 206 can include a media playback device, such as a television, a projector device, a game console, desktop computer, and/or any other suitable non-mobile device. As yet another example, in some implementations, user devices 206 can include a virtual assistant device, voice-controlled speakers, and/or any other suitable type of device.

In a more particular example, user device 206 can be a display device that includes hardware and/or software for presenting media received from one or more sources of media content. For example, user device 206 can include a television, a smart television, a monitor, a set-top box, an audio video (AV) receiver, any other suitable media playback device and/or any suitable combination thereof. More particularly, user device 206 can include a display, speakers, hardware and/or software for rendering media content such as analog and/or digital video and/or audio data, a power supply, etc. User device 206 can, in some implementations, include various input ports for receiving video and/or audio data from various sources. Such input ports can include one or more HDMI ports, one or more component video ports, one or more composite video ports, one or more USB ports, one or more S-Video ports, one or more TOSLINK ports, one or more coaxial ports, one or more Ethernet ports (whether wired or wireless), etc.

In another more particular example, user device 206 can be any suitable device that can receive an audio signal and output the audio signal (potentially through one or more intermediate devices) to one or more speakers. For example, user device 206 can be an audio video (AV) receiver, a speaker, an amplifier, an audio switch, an HDMI switch, any other suitable audio system and/or any suitable combination thereof. More particularly, user device 206 can include, speakers, hardware and/or software for rendering media content such as analog and/or digital audio and/or video data, a power supply, etc. User device 206 can include various input ports for receiving audio and/or video data from various sources. Such input ports can include one or more HDMI ports, one or more component video ports, one or more composite video ports, one or more USB ports, one or more S-Video ports, one or more TOSLINK ports, one or more coaxial ports, one or more Ethernet ports (whether wired or wireless), etc. Additionally or alternatively, in some implementations, user device 206 can be configured to receive an audio signal over any suitable wireless connection, such as over a connection to a local area network (e.g., via a connection that complies with one of the IEEE 802.11x family of protocols which are sometimes referred to as Wi-Fi connections), or a wireless connection between external sound system 106 and computing device 102, such as an ad hoc wireless network connection, a short-range wireless communication protocol (e.g., Bluetooth, Bluetooth Low Energy, Wireless USB, etc.), etc.

Although server(s) 202 is illustrated as one device, the functions performed by server(s) 202 can be performed using any suitable number of devices in some implementations. For example, in some implementations, multiple devices can be used to implement the functions performed by server(s) 202.

Although two user devices 208 and 210 are shown in FIG. 2 to avoid over-complicating the figure, any suitable number of user devices, and/or any suitable types of user devices, can be used in some implementations.

Figure 3:
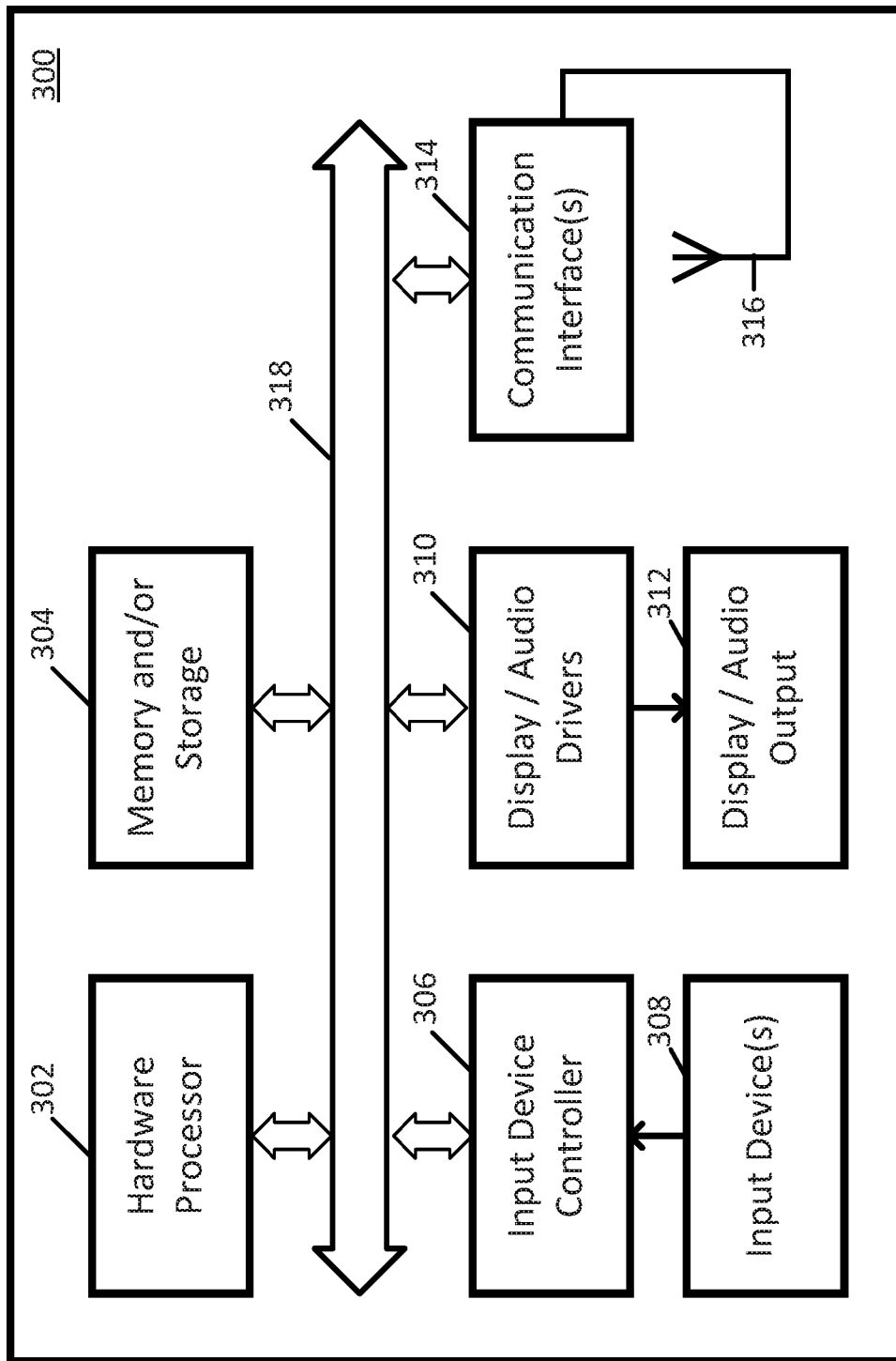
FIG. 3 shows a detailed example of hardware that can be used in a server and/or a user device of FIG. 2 in accordance with some implementations of the disclosed subject matter.

Server(s) 202 and user devices 206 can be implemented using any suitable hardware in some implementations. For example, in some implementations, devices 202 and 206 can be implemented using any suitable general purpose computer or special purpose computer. For example, a mobile phone may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some implementations. In some implementations, hardware processor 302 can be controlled by a server program stored in memory and/or storage 304 of a server (e.g., such as one of server(s) 202). For example, in some implementations, the server program can cause hardware processor 302 to analyze received audio and/or video data using any suitable technique(s), store associations of particular devices with particular types of queries, and/or perform any other actions. In some implementations, hardware processor 302 can be controlled by a computer program stored in memory and/or storage 304 of user device 206. For example, the computer program can cause hardware processor 302 to record audio and/or video data, detect an event based on the recorded audio and/or video data, cause information relating to the recorded data to be presented, and/or perform any other suitable actions.

Memory and/or storage 304 can be any suitable memory and/or storage for storing programs, data, media content, and/or any other suitable information in some implementations. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some implementations. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some implementations. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 210 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 206) in some implementations. In some implementations, antenna 316 can be omitted.

Bus 318 can be any suitable mechanism for communicating between two or more components 302, 304, 306, 310, and 314 in some implementations.

Any other suitable components can be included in hardware 300 in accordance with some implementations.

Figure 4:
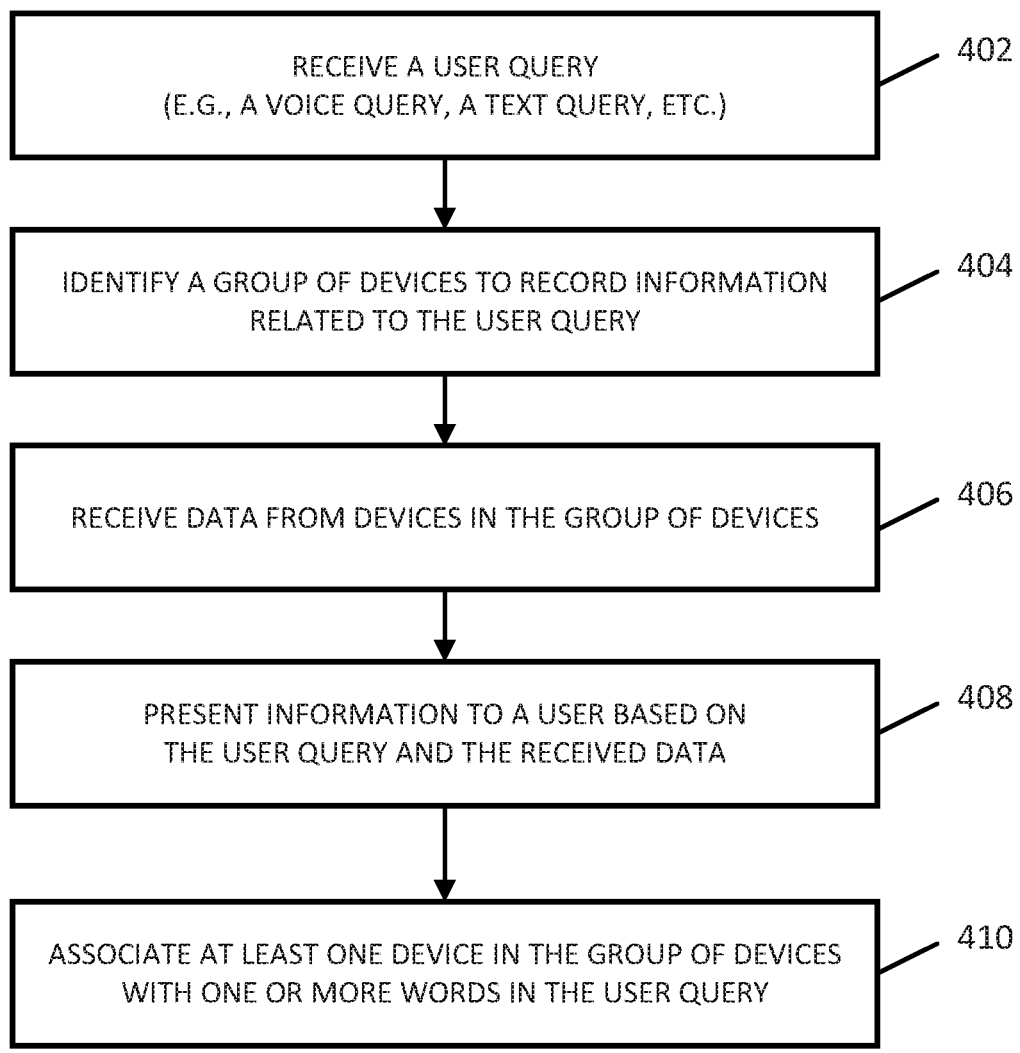
FIG. 4 shows an example of a process for providing information in response to a user query in accordance with some implementations of the disclosed subject matter.

Turning to FIG. 4, an example 400 of a process for providing information in response to a user's query is shown in accordance with some implementations of the disclosed subject matter.

Process 400 can begin by receiving, from a user device, a query at 402. In some implementations, the query can request any suitable type of information relating to, for example, one or more objects in the user's home. Examples of queries can include "listen to my baby in the bedroom," "what is my dog doing?" and/or any other suitable query. In some implementations, the query can indicate any suitable information, such as a particular object (e.g., child, pet, and/or any other suitable object or person), a location (e.g., bedroom, basement, upstairs, downstairs, backyard, and/or any other suitable location), an action (e.g., sleeping, crying, barking, and/or any other suitable action), and/or any other suitable information. In some implementations, the query can be received in any suitable manner, for example, as a voice query received by a user device via a microphone associated with the user device, as a text query entered via a keyboard on the user device, and/or in any other suitable manner. In some implementations, the query can indicate a room and/or a particular device that is to be activated. For example, in some implementations the query can specify that a baby monitor is to be activated, that a virtual assistant device in a particular room is to be activated, and/or any other suitable devices. As a more particular example, in some implementations, the query can indicate that audio from a particular device is to be recorded and presented (e.g., in real-time, and/or with any suitable delay) via the user device.

At 404, process 400 can identify one or more devices in the user's home to receive and/or record information related to the received query. In some implementations, the one or more devices can be any suitable types of devices, such as mobile devices (e.g., mobile phones, tablet computers, and/or any other suitable type of mobile device), virtual assistant devices, a web camera, and/or any other suitable type of device.

In some implementations, process 400 can identify the one or more devices based on any suitable information. For example, in some implementations, process 400 can identify the one or more devices based on information included in the query. As a more particular example, in instances where the query includes location information (e.g., bedroom, outside, backyard, downstairs, and/or any other suitable location information), process 400 can identify one or more devices that are located in the indicated location and/or are near the indicated location. As a specific example, in instances where the query indicates that information is to be recorded from a kitchen of the user's home, process 400 can identify one or more devices located in or near the kitchen. As another more particular example, in instances where the query indicates a particular object or person (e.g., the user's child or pet, and/or any other suitable object or person), process 400 can identify one or more devices near a typical location the object or person is typically located in (e.g., a child's bedroom, a living room, and/or any other suitable location). In some such implementations, process 400 can identify the one or more devices near a typical location the object or person is typically located in based on any suitable information, such as explicitly provided information (e.g., a device indicated as a baby monitor, a device indicated as being located in a particular room) and/or based on implicitly inferred information. For example, in instances where process 400 identifies the one or more devices based on implicitly inferred information, the devices may be identified based on locating devices known to be within a particular room or based on sounds or images that have been previously recorded from the device. As a more particular example, process 400 can identify a particular device as likely to be in a baby's room based on a determination that sounds typically associated with babies have been previously recorded using the particular device. In some such implementations, process 400 can request confirmation from a user of the user device that the particular device is located in an inferred location (e.g., via an interface that presents a question such as "is this device a baby monitor?" and/or in any other suitable manner).

Note that, in some implementations, the query can include one or more words that can be considered trigger words or trigger phrases, as described below in more detail in connection with block 410. For example, in some implementations, the trigger words or trigger phrases can include a type of person or object (e.g., "baby," "dog," and/or any other suitable type of person or object) and/or a particular name of a person or object (e.g., a name of the user's child or pet). In some such implementations, the trigger words or trigger phrases can be associated with particular devices, for example, based on previously detected sounds or images recorded by the device, as described below in more detail in connection with block 410. In some implementations, if it is determined that the query does not include any trigger words and/or that no words or phrases in the query have been previously associated with particular devices, process 400 can determine that multiple devices in the user's environment (e.g., all of the devices, all of the devices near a particular location, all of the devices capable of recording video data, and/or any other suitable group of devices) are to be activated to record audio and/or video data in response to receiving the query.

Note that, in some implementations, process 400 can determine which devices are in or near a particular location using any suitable technique or combination of techniques. For example, in some implementations, process 400 can use stored information that has been explicitly provided by the user that indicates, for example, that a particular virtual assistant device is located in a particular location, that a particular smart television is located in a particular bedroom, and/or any other suitable location and device combination. As another example, in some implementations, process 400 can have previously determined an association between a particular device and a location based on previous queries, as described below in more detail in connection with block 410. In some such implementations, process 400 can use implicitly determined location information to identify the one or more devices.

As another example, in some implementations, process 400 can identify the one or more devices based on device capabilities required to determine information associated with the received query. As a more particular example, in instances where the query indicates that audio information may be useful, process 400 can identify one or more devices that include and/or are associated with a microphone (e.g., mobile devices, web cameras, virtual assistant devices, and/or any other suitable devices). As a specific example, a query such as "is my baby crying?" may indicate that audio information may be useful. As another more particular example, in instances where the query indicates that video information may be useful, process 400 can identify one or more devices that include and/or are associated with a camera. As a specific example, a query such as "where is my dog?" may indicate that video information may be useful.

As yet another example, in some implementations, process 400 can present a user interface on the user device that received the query that requests an indication of a recording device from a user of the user device. As a more particular example, in some implementations, process 400 can present a group of available recording devices and can request that the user select one or more of the recording devices to record data relevant to the query. In some such implementations, process 400 can identify the available recording devices in any suitable manner, for example, by identifying recording devices connected to a communication network (e.g., a WiFi network, a LAN, a BLUETOOTH network, and/or any other suitable communication network) within the user's home.

Process 400 can receive data from the one or more devices at 406. For example, in some implementations, process 400 can receive audio recordings and/or video recordings from microphones and/or cameras associated with each of the devices. Note that, in some implementations, data can be received from any suitable number (e.g., one, two, five, and/or any other suitable number) of devices. Process 400 can receive data in any suitable manner. For example, in some implementations, process 400 can cause a microphone associated with the device to be activated to record audio data. As another example, in some implementations, process 400 can cause a camera associated with the device to be activated to record image and/or video data. Note that, in some implementations, a microphone and/or a camera associated with the device may already be activated, and process 400 can cause the audio and/or video data to be saved for processing. In some implementations, process 400 can cause captured audio and/or video data to be transmitted to server(s) 202 for processing.

In some implementations, process 400 can capture audio and/or video data and process the recorded audio and/or video data until it is determined that the captured data includes information relevant to the query. For example, in instances where the query indicates that information about the user's baby is requested, process 400 can record audio and/or video data until sounds associated with a baby (e.g., crying, babbling, and/or any other suitable sounds) are detected in the recorded data. As another example, in instances where the query indicates that information about the user's dog is requested, process 400 can record audio and/or video data until sounds associated with a dog (e.g., barking, scratching, and/or any other suitable sound) are recorded and/or an image of a dog is captured. In some implementations, audio data and/or video data can be stored in any suitable manner prior to processing. For example, in some implementations, audio data and/or video data can be stored in a circular buffer of any suitable size, and data that is determined to not be relevant to the query can be discarded after it is processed and/or analyzed. As a more particular example, in instances where the query indicates that information about the user's baby is requested, process 400 can record chunks of audio data from one or more devices, analyze the chunks of recorded audio data to determine if sounds associated with a baby are present in the recorded audio data, and, if it is determined that sounds associated with a baby are not present, delete the recorded chunks of audio data. As another more particular example, process 400 can record chunks of video data from one or more devices, analyze the chunks of recorded video data to determine if images associated with the query (e.g., images of the user's baby, images of the user's pet, and/or any other suitable image content) are present in the recorded video data, and if it is determined that images associated with the query are not present, delete the recorded chunks of video data.

In some implementations, process 400 can analyze recorded audio data in any suitable manner. For example, in some implementations, process 400 can compare the audio data and/or signatures generated based on the recorded audio data to determine whether the recorded audio data matches a sound stored in a database of sounds. In some implementations, the database of sounds can include any suitable sounds, such as a baby crying, a dog barking, a dog or cat scratching, children playing, and/or any other suitable sounds that can be used to identify a recorded sound. In some implementations, process 400 can generate an audio fingerprint to compare the recorded audio to sounds in the database of sounds using any suitable technique(s). For example, in some implementations, process 400 can generate an audio fingerprint that indicates a spectrum corresponding to any suitable frequencies, and/or any other suitable information.

Process 400 can present information to a user based on the user query and the received data at 408. In some implementations, process 400 can present any suitable information related to the user query. For example, in instances where the query is "listen to my baby in the bedroom," process 400 can present an audio recording from the bedroom, a video recording from the bedroom, a description of recorded data (e.g., "no noise in the bedroom," "your baby is still asleep," and/or any other suitable description), and/or any other suitable response to the query. In instances where audio data, image data, and/or video data is presented, process 400 can present the audio data, image data, and/or video data in any suitable manner. For example, in some implementations, process 400 can present any suitable audio or video on the user device used to by the user to input the query. As another example, in some implementations, the audio and/or video can be presented within a user interface that includes any other suitable options for interaction, such as a selectable input to present the audio and/or video on a different user device, a selectable input to record additional audio and/or video data from the same recording device, and/or any other suitable options. As another example, in instances where the query asks a yes or no question, process 400 can present an answer to the query. More particular examples of yes/no questions can include: "is my baby sleeping?"; "is my dog barking?" and/or any other suitable question.

Note that, in some implementations, the user device that presents the information can be remote from the user's home and/or the recording devices. For example, in some implementations, a user of the user device may have transmitted the query via the user device when at a remote location (e.g., the user's office, on a trip, and/or any other suitable remote location), and may request information about the user's home (e.g., objects or people in the user's home) using data recorded by recording devices within the user's home.

At 410, process 400 can associate at least one device of the one or more devices with one or more trigger words and/or trigger terms in the query. For example, in some implementations, the device can be associated with the one or more trigger words in the query to identify suitable devices to use to answer similar queries in the future. In some implementations, process 400 can associate the at least one device with the one or more trigger words in the query based on any suitable information. For example, in instances where the query requested information about a user's child, and a particular device detected sounds or noises associated with a child (e.g., a virtual assistant device in a particular bedroom, and/or any other suitable device), process 400 can associate the particular device with the child and/or the name of the child used in the query. As another example, in instances where the query referenced a particular location (e.g., bedroom, living room, and/or any other suitable location), process 400 can associate a device that records relevant data (e.g., sounds or images of a pet, and/or any other suitable relevant data) with the particular location.

Note that, in some implementations, process 400 can use any suitable natural language processing techniques with respect to the query to associate at least one device with the one or more words in the query. For example, in an instance where the query is "listen to my baby in the other room," process 400 can determine that the user's home has more than one room (e.g., a room other than the room the user is currently in), and can determine that a room that includes a device that detects the baby is "the other room."

Additionally, note that, in some implementations, process 400 can begin recording audio and/or video data in response to detecting a trigger word or trigger phrase. For example, in some implementations, the trigger word or trigger phrase can include a type of person or object and/or a particular name of a person or object. As a more particular example, in some implementations, the trigger word can include "baby," "dog," "cat," a name of the user's child, a name of the user's pet, and/or any other suitable word or name. As another example, in some implementations, the trigger word or trigger phrase can include a location in the user's environment, such as "kitchen," "living room," "baby's room,"

and/or any other suitable location. In some implementations, in response to detecting the trigger word or trigger phrase, process 400 can begin recording from any suitable devices to determine if sounds or images associated with the trigger word or trigger phrase are included in the recorded audio or video data. For example, in instances where the detected trigger word is "baby," process 400 can begin recording audio and/or video data to determine if sounds associated with a baby can be detected. In some implementations, process 400 can activate any suitable devices in response to detecting a trigger word or trigger phase. Additionally or alternatively, in some implementations, process 400 can select the device to be activated based on the trigger word or trigger phrase. For example, in some implementations, in instances where the detected trigger word is "baby," process 400 can activate one or more devices that have previously detected sounds associated with babies and/or one or more devices known to be in a location associated with the baby as indicated by the user (e.g., the baby's room, and/or any other suitable location).

Figure 5:
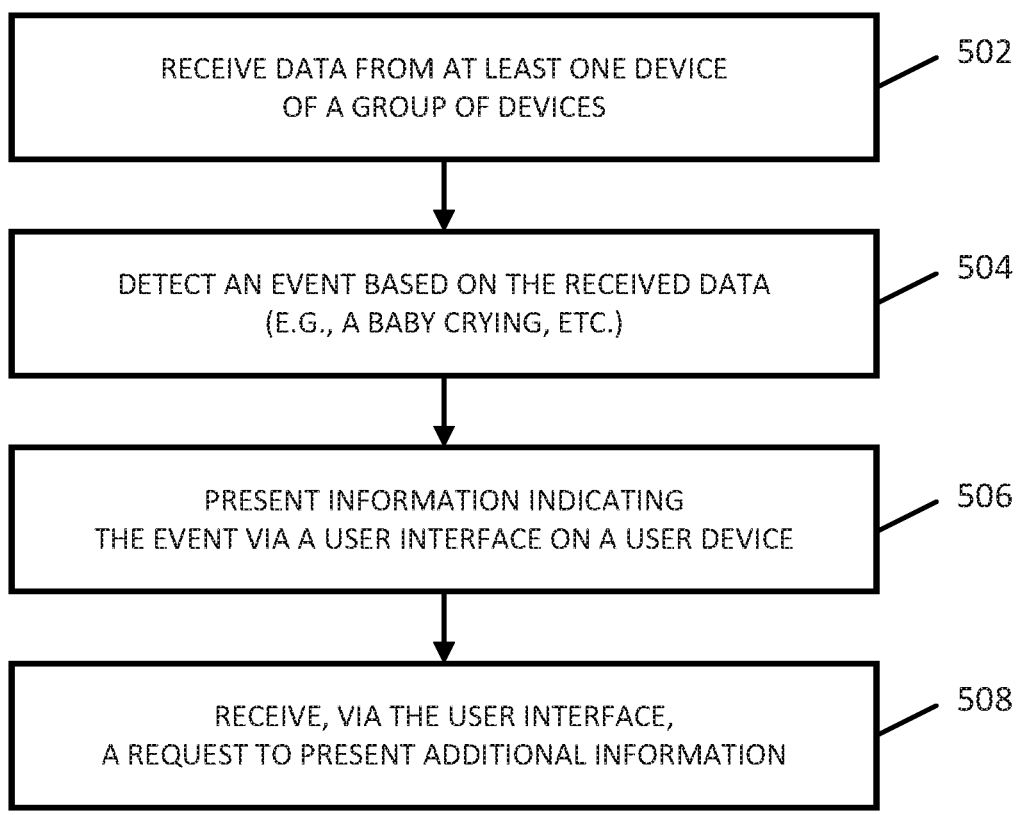
FIG. 5 shows an example of a process for providing information in response to a detected event in accordance with some implementations of the disclosed subject matter.

Turning to FIG. 5, an example 500 of a process for detecting an event and presenting information indicating the event is shown in accordance with some implementations of the disclosed subject matter.

Process 500 can begin, at 502, by receiving data from one or more devices. For example, as described above in connection with block 406 of FIG. 4, the data can include any suitable audio data and/or video data recorded from a microphone and/or a camera associated with the device. In some implementations, audio data and/or video data can be of any suitable length (e.g., one second, two seconds, ten seconds, and/or any other suitable length). In some implementations, the data can be received by a server for processing and analysis from the one or more devices.

At 504, process 500 can detect an event based on the received data. In some implementations, the event can relate to a particular object or person. For example, in some implementations, the event can be that a user's baby is crying, that a user's child is awake, that a user's dog is barking, that a user's pet is scratching at furniture, and/or any other suitable event. In some implementations, process 500 can detect the event using any suitable technique or combination of techniques. For example, in some implementations, process 500 can analyze recorded audio data to determine whether the audio data includes particular sounds (e.g., a baby crying or babbling, a child talking, sounds of toys, a dog barking or scratching, and/or any other suitable sounds). As another example, in some implementations, process 500 can analyze recorded video data to determine if a particular object or person is included in the video, and if a person or object is included in the video, a current state or activity of the person or object. As a more particular example, in some implementations, process 500 can use any suitable image processing or image recognition techniques to determine if the video data includes a dog, and can then determine if the dog is sleeping or awake, barking or quiet, and/or any other suitable characteristics. Note that, in some implementations, process 500 can use any suitable technique or combination of techniques to analyze recorded data to detect the event. For example, in some implementations, process 500 can compare an audio fingerprint generated based on recorded audio data to a database of known sounds (as described above in connection with block 406 of FIG. 4) to determine if recorded audio data includes a known sound such as a baby crying or a dog barking. As another example, in some implementations, process 500 can analyze recorded video data using any suitable image recognition techniques to determine if the recorded video data includes a known object or person (e.g., the user's pet, the user's child, and/or any other suitable known object or person) and/or a particular type of object or person (e.g., a child, a dog, a cat, and/or any other suitable type of object or person).

In some implementations, process 500 can determine a likelihood that the detected event will be of interest to the user. In some implementations, process 500 can determine the likelihood based on any suitable information. For example, in some implementations, process 500 can determine the likelihood based on previous information that has been presented to the user and based on the user's reaction to the previously presented information. As a more particular example, in instances where process 500 determines that the user has previously been presented with an indication of the same or a similar event (e.g., "your baby is crying," "your dog is scratching the couch," and/or any other suitable event), process 500 can determine whether the user requested additional information based on the event (e.g., requested to view audio or video data relating to the event, requested that a device associated with the detected event be activated to record additional audio or video data, and/or requested any other suitable additional information). Continuing with this example, in instances where process 500 determines that the user has previously requested additional information, process 500 can assign a relatively higher likelihood (e.g., greater than 50%, greater than 70%, and/or any other suitable likelihood) relative to instances where process 500 determines that the user has generally not requested additional information. Additionally or alternatively, in some implementations, process 500 can assign a confidence value to the determined likelihood. In some such implementations, the confidence value can be based on a number of times the detected event or a similar event has been presented to the user. For example, in some implementations, a detected event that has been presented to the user only one previous time can be assigned a relatively lower confidence value relative to a detected even that has been presented to the user ten previous times. Furthermore, in some implementations, the confidence value can be based on a variability of the user's responses to previously presented similar events. In some implementations, the confidence value can be based on explicit feedback received from a user of the user device. For example, in some implementations, after presenting an indication of a detected event (e.g., "I heard your dog barking," "I heard your baby crying," and/or any other suitable detected event), process 500 can present a message requesting feedback on whether the detected event was correct and/or of interest to the user. As a more particular example, in some implementations, the message requesting feedback can be "was your dog barking?" and/or "was this event of interest to you?" In some such implementations, the message can include any suitable user interface controls for receiving feedback from the user in response to the message, such as radio buttons for selecting "yes" or "no," and/or any other suitable user interface controls. In some such implementations, the explicit feedback can be used to set the confidence value for similar detected events in the future.

At 506, process 500 can present information indicating the event via a user interface on a user device. For example, in some implementations, process 500 can present a message that indicates that a crying baby has been detected, a barking dog has been detected, and/or any other suitable message.

In some implementations, process 500 can determine whether to present the information indicating the event based on any suitable information. For example, in some implementations, process 500 can determine that the information is to be presented if the determined likelihood that the event will be of interest to the user exceeds a predetermined threshold (e.g., greater than 50%, greater than 70%, and/or any other suitable likelihood). As another example, in some implementations, process 500 can determine that the information is to be presented if the determined likelihood exceeds a first predetermined threshold and the determined confidence value exceeds a second predetermined threshold (e.g., greater than 50%, greater than 70%, and/or any other suitable confidence value). As another example, in some implementations, process 500 can determine whether the information is to be presented based on user preferences. As a more particular example, in some implementations, the user preferences can indicate that a user wants to receive information obtained from particular recording devices (e.g., a baby monitor, a particular voice-controlled speaker, and/or any other suitable device) during certain times of day (e.g., between 9 p.m. and 6 a.m., and/or any other suitable times). As another more particular example, in some implementations, a user can explicitly activate alerts regarding a particular recording device or object in the user's home.

At 508, process 500 can receive, via the user interface, a request to present additional information. For example, in some implementations, the user interface can additionally include one or more selectable inputs to allow the user to request additional information. For example, in some implementations, the user interface can include a selectable input that, when selected, causes recorded audio data to be presented via the user device. As another example, in some implementations, the user interface can include a selectable input that, when selected, causes a microphone associated with a device that recorded data corresponding to the detected event to be activated, and additional recorded audio data to be presented via the user device. As still another example, in some implementations, the user interface can include a selectable input that, when selected causes recorded audio data or video data to be presented on a second user device, such as a nearby television.

In some implementations, at least some of the above described blocks of the processes of FIGS. 4 and 5 can be executed or performed in any order or sequence not limited to the order and sequence shown in and described in connection with the figures. Also, some of the above blocks of FIGS. 4 and 5 can be executed or performed substantially simultaneously where appropriate or in parallel to reduce latency and processing times. Additionally or alternatively, some of the above described blocks of the processes of FIGS. 4 and 5 can be omitted.

In some implementations, any suitable computer readable media can be used for storing instructions for performing the functions and/or processes herein. For example, in some implementations, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for providing information related to detected events are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for providing information, comprising:
   associating a first recording device of a group of recording devices located in an environment of a user with a trigger term, wherein the trigger term indicates an animate object that is associated with the first recording device and a location of the first recording device within the environment of the user;
   receiving, from a user device, a query that includes the trigger term;
   determining, based on the received query, that audio data is to be transmitted from at least one recording device from the group of recording devices in the environment of the user;
   identifying the first recording device from the group of recording devices in which the audio data is to be received based on the inclusion of the trigger term in the received query;
   in response to detecting the trigger term and identifying the first recording device, activating the first recording device and receiving the audio data from the first recording device;
   detecting, within the audio data that was received from the activated first recording device, an event related to the animate object indicated in the trigger term in the environment of the user;
   determining a likelihood that the detected event is of interest to the user based on previous information that has been presented to the user on the user device, wherein a confidence value is assigned to the determined likelihood based on a number of times that the detected event was presented to the user on the user device; and
   in response to determining that the likelihood that the detected event is of interest to the user is greater than a first predetermined threshold value and in response to determining that the confidence value is greater than a second predetermined threshold value, presenting information indicating the event related to the animate object on the user device.

2. The method of claim 1, wherein associating the first recording device with the trigger term is based on audio data previously recorded by the first recording device.

3. The method of claim 1, wherein associating the first recording device with the trigger term is based on a known location of the first recording device within the environment of the user.

4. The method of claim 1, wherein associating the first recording device with the trigger term is based on an inferred location of the first recording device, wherein the inferred location is determined based on a previously received query from the user device.

5. The method of claim 1, wherein the information is presented within a user interface that includes a selectable input that causes the received audio data to be presented by the user device.

6. The method of claim 1, wherein the information is presented within a user interface that includes a selectable input that causes the first recording device to record additional audio data.

7. A system for providing information, the system comprising:
a hardware processor that is programmed to:
associate a first recording device of a group of recording devices located in an environment of a user with a trigger term, wherein the trigger term indicates an animate object that is associated with the first recording device and a location of the first recording device within the environment of the user;
receive, from a user device, a query that includes the trigger term;
determine, based on the received query, that audio data is to be transmitted from at least one recording device from the group of recording devices in the environment of the user;
identify the first recording device from the group of recording devices in which the audio data is to be received based on the inclusion of the trigger term in the received query;
in response to detecting the trigger term and identifying the first recording device, activate the first recording device and receive the audio data from the first recording device;
detect, within the audio data that was received from the activated first recording device, an event related to the animate object indicated in the trigger term in the environment of the user;
determine a likelihood that the detected event is of interest to the user based on previous information that has been presented to the user on the user device, wherein a confidence value is assigned to the determined likelihood based on a number of times that the detected event was presented to the user on the user device; and
in response to determining that the likelihood that the detected event is of interest to the user is greater than a first predetermined threshold value and in response to determining that the confidence value is greater than a second predetermined threshold value, present information indicating the event related to the animate object on the user device.

8. The system of claim 7, wherein associating the first recording device with the trigger term is based on audio data previously recorded by the first recording device.

9. The system of claim 7, wherein associating the first recording device with the trigger term is based on a known location of the first recording device within the environment of the user.

10. The system of claim 7, wherein associating the first recording device with the trigger term is based on an inferred location of the first recording device, wherein the inferred location is determined based on a previously received query from the user device.

11. The system of claim 7, wherein the information is presented within a user interface that includes a selectable input that causes the received audio data to be presented by the user device.

12. The system of claim 7, wherein the information is presented within a user interface that includes a selectable input that causes the first recording device to record additional audio data.

13. A non-transitory computer-readable medium containing computer executable instructions that, when executed by a processor, cause the processor to perform a method for providing information, the method comprising:
associating a first recording device of a group of recording devices located in an environment of a user with a trigger term, wherein the trigger term indicates an animate object that is associated with the first recording device and a location of the first recording device within the environment of the user;
receiving, from a user device, a query that includes the trigger term;
determining, based on the received query, that audio data is to be transmitted from at least one recording device from the group of recording devices in the environment of the user;
identifying the first recording device from the group of recording devices in which the audio data is to be received based on the inclusion of the trigger term in the received query;
in response to detecting the trigger term and identifying the first recording device, activating the first recording device and receiving the audio data from the first recording device;
detecting, within the audio data that was received from the activated first recording device, an event related to the animate object indicated in the trigger term in the environment of the user;
determining a likelihood that the detected event is of interest to the user based on previous information that has been presented to the user on the user device, wherein a confidence value is assigned to the determined likelihood based on a number of times that the detected event was presented to the user on the user device; and
in response to determining that the likelihood that the detected event is of interest to the user is greater than a first predetermined threshold value and in response to determining that the confidence value is greater than a second predetermined threshold value, presenting information indicating the event related to the animate object on the user device.

14. The non-transitory computer-readable medium of claim 13, wherein associating the first recording device with the trigger term is based on audio data previously recorded by the first recording device.

15. The non-transitory computer-readable medium of claim 13, wherein associating the first recording device with the trigger term is based on a known location of the first recording device within the environment of the user.

16. The non-transitory computer-readable medium of claim 13, wherein associating the first recording device with the trigger term is based on an inferred location of the first recording device, wherein the inferred location is determined based on a previously received query from the user device.

17. The non-transitory computer-readable medium of claim 13, wherein the information is presented within a user interface that includes a selectable input that causes the received audio data to be presented by the user device.

18. The non-transitory computer-readable medium of claim 13, wherein the information is presented within a user interface that includes a selectable input that causes the first recording device to record additional audio data.

\* \* \* \* \*